United States Patent
Liao

(10) Patent No.: US 9,259,791 B2
(45) Date of Patent: Feb. 16, 2016

(54) DRILLING MACHINE

(71) Applicant: Shajeng Hardware Co., Ltd., Taichung (TW)

(72) Inventor: Jen Tsung Liao, Taichung (TW)

(73) Assignee: Shajeng Hardware Co., Ltd., Taichung (TW)

( * ) Notice: Subject to any disclaimer, the term of this patent is extended or adjusted under 35 U.S.C. 154(b) by 222 days.

(21) Appl. No.: 14/097,315

(22) Filed: Dec. 5, 2013

(65) Prior Publication Data

US 2015/0158093 A1 Jun. 11, 2015

(51) Int. Cl.
*B23B 39/00* (2006.01)
*B23B 47/26* (2006.01)
*B25H 1/00* (2006.01)
*B23B 45/02* (2006.01)
*B23Q 3/154* (2006.01)

(52) U.S. Cl.
CPC ............... *B23B 39/00* (2013.01); *B23B 47/26* (2013.01); *B25H 1/005* (2013.01); *B23B 45/02* (2013.01); *B23B 2250/12* (2013.01); *B23B 2260/036* (2013.01); *B23B 2270/022* (2013.01); *B23Q 3/1543* (2013.01); *Y10T 408/44* (2015.01); *Y10T 408/675* (2015.01)

(58) Field of Classification Search
CPC .............. B23B 47/26; B23B 2250/12; B23B 2260/036; B23B 2270/022; B23B 39/00; B23B 45/02; B23B 45/00; B23Q 3/1543; B25H 1/0071; F16G 13/16; Y10T 408/554; Y10T 408/885; Y10T 408/44
See application file for complete search history.

(56) References Cited

U.S. PATENT DOCUMENTS

| | | | | |
|---|---|---|---|---|
| 3,791,755 A | * | 2/1974 | Warren | 408/76 |
| 5,035,549 A | * | 7/1991 | Asano et al. | 408/132 |
| 5,126,643 A | * | 6/1992 | French | 318/434 |
| 5,342,153 A | * | 8/1994 | Dobkins | 408/1 R |
| 5,415,503 A | * | 5/1995 | Strange et al. | 408/76 |
| 7,494,281 B2 | * | 2/2009 | Hidaka | 384/39 |
| 2013/0004255 A1 | * | 1/2013 | Fischinger et al. | 408/111 |
| 2013/0287508 A1 | * | 10/2013 | Timmons et al. | 408/16 |

FOREIGN PATENT DOCUMENTS

| | | | | | |
|---|---|---|---|---|---|
| GB | 2311028 A | * | 9/1997 | | B23B 45/14 |
| JP | 04-189406 A | * | 7/1992 | | B23B 47/00 |
| JP | 2006-061993 A | * | 3/2006 | | B23B 47/00 |

* cited by examiner

*Primary Examiner* — Sunil K Singh
*Assistant Examiner* — Ryan Rufo
(74) *Attorney, Agent, or Firm* — Alan D. Kamrath; Kamrath IP Lawfirm, P.A.

(57) ABSTRACT

A drilling machine includes a frame, a control unit, a drilling unit and a cable assembly. The control unit is connected to the frame. The drilling unit is movably supported on the frame. The cable assembly electrically connects the control unit to the drilling unit. The cable assembly is substantially concealed by and between the frame and the drilling unit.

15 Claims, 8 Drawing Sheets

DRILLING MACHINE

BACKGROUND OF INVENTION

1. Field of Invention

The present invention relates to a drilling machine and, more particularly, to a robust drilling machine.

2. Related Prior Art

Referring to FIG. 8, a conventional drilling machine includes a frame 91, a motor 92, a chuck 93, a cable 94, a basket 95, a bottle 96, a pipe 97 and an elevating unit 98. The motor 92 is movably supported on the frame 91. The chuck 93 is operatively connected to the motor 92. A control unit (not shown) is supported on the frame 91. The motor 92 is electrically connected to the control unit via the cable 94. The basket 95 is connected to the frame 91. The bottle 96 is placed in the basket 95. The chuck 93 is connected to the bottle 96 via the pipe 97. The elevating unit 98 is operatively connected to the motor 92. The elevating unit 98 is operable to move the motor 92 up and down on the frame 91. The elevating unit 98 includes several handles. Coolant is contained in the bottle 96. In operation, the coolant is transmitted to the chuck 93 from the bottle 96. Then, the coolant is transmitted to a drill from the chuck 93.

The cable 94 is exposed to a user. A user is tempted to carry the drilling machine by the cable 94. The cable 94 could easily be torn from the motor 92 or the control unit, and this is not desired.

The basket 95, the bottle 96 and the pipe 97 are placed out of the frame 91. The basket 95, the bottle 96 and the pipe 97 could easily be hit and damaged. The basket 95 and the pipe 97 could easily be tangled with an external object and get damaged. The basket 95 and the pipe 97 could easily be tangled with an external object and get damaged or torn from the chuck 93 or the bottle 96.

Therefore, the present invention obviates or at least alleviates the problems encountered in the prior art.

SUMMARY OF INVENTION

It is the primary objective of the present invention to provide a robust drilling machine.

To achieve the foregoing objective, the drilling machine includes a frame, a control unit connected to the frame, a drilling unit movably supported on the frame, and a cable assembly for electrically connecting the control unit to the drilling unit. The cable assembly is substantially concealed by and between the frame and the drilling unit.

Other objectives, advantages and features of the present invention will be apparent from the following description referring to the connected drawings.

BRIEF DESCRIPTION OF DRAWINGS

The present invention will be described via detailed illustration of two embodiments versus the prior art referring to the drawings wherein.

DETAILED DESCRIPTION OF PREFERRED EMBODIMENTS

Figure 1:
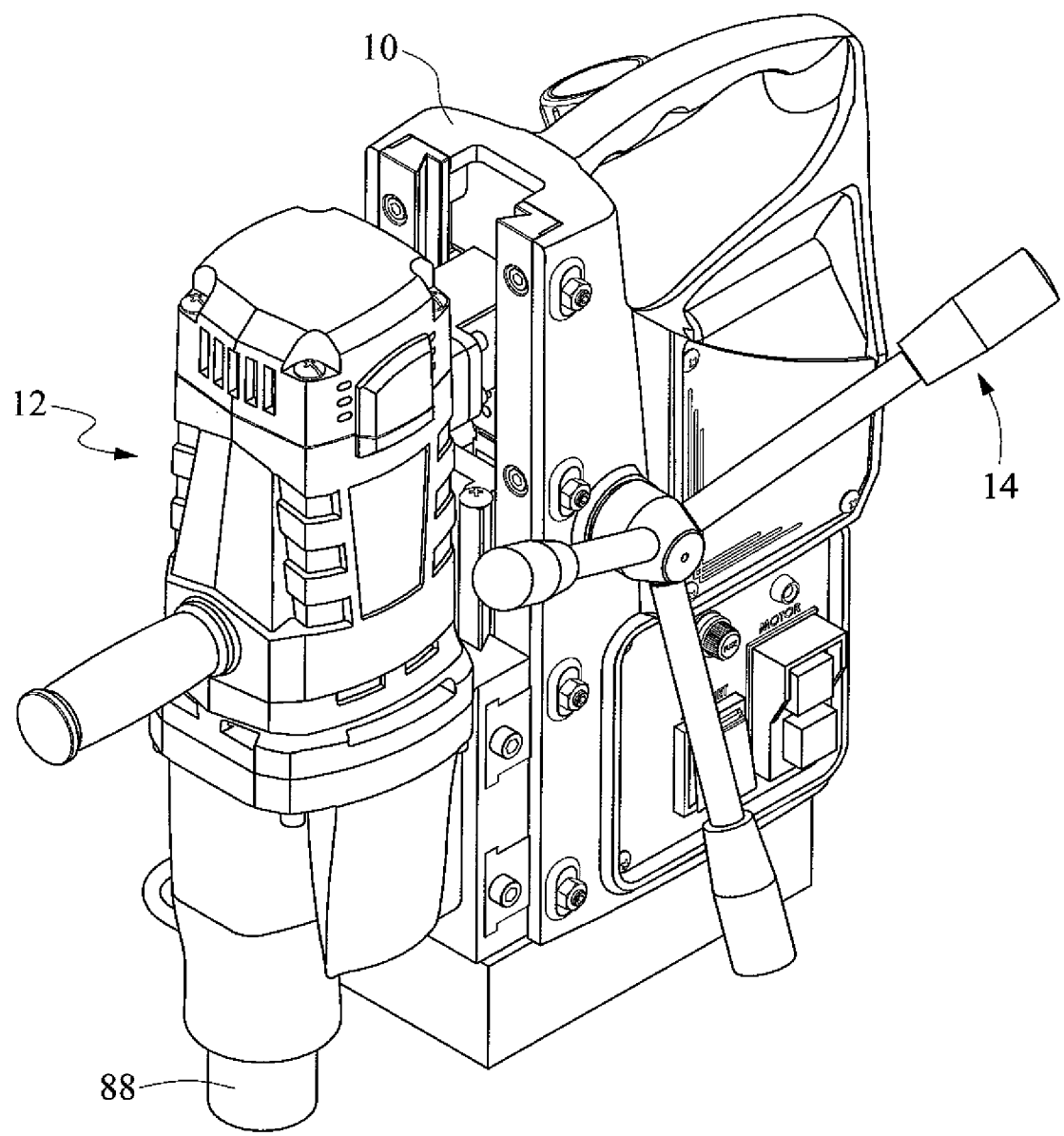
FIG. 1 is a perspective view of a drilling machine according to the first embodiment of the present invention.
Figure 2:
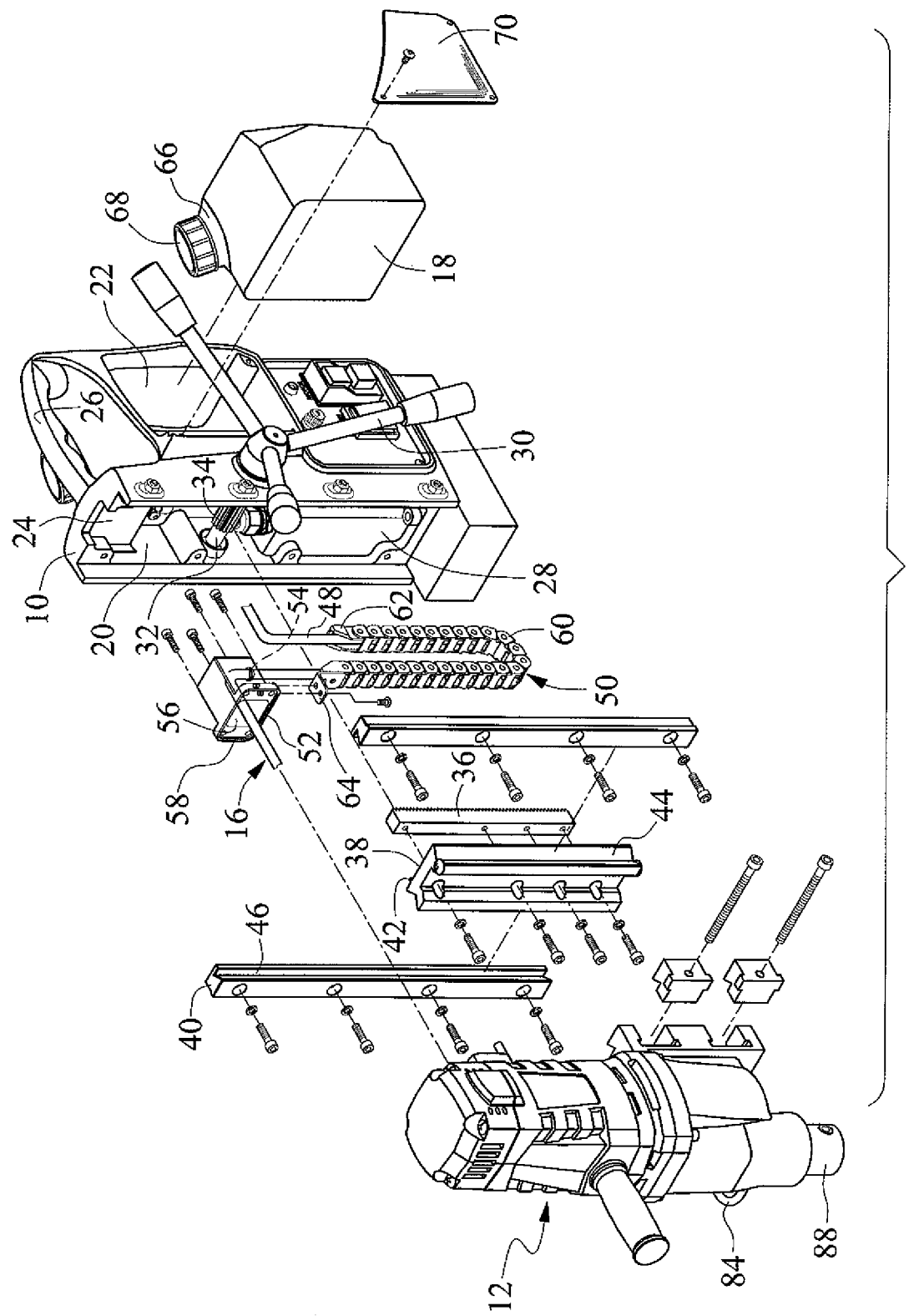
FIG. 2 is an exploded view of the drilling machine illustrated in FIG. 1.

Referring to FIGS. 1 and 2, there is a drilling machine according to the preferred embodiment of the present invention. The drilling machine includes a frame 10, a drilling unit 12, an elevating unit 14, a cable assembly 16 and a container 18.

The frame 10 includes first and second chambers 20 and 22, a cutout 24 and a handle 26. The first chamber 20 is made in a front portion of the frame 10. The second chamber 22 is made in a rear portion of the frame 10.

The cutout 24 is made in an upper portion of the frame 10. The cutout 24 is in communication with the first chamber 20. The handle 26 is formed on the upper portion of the frame 10.

A control unit 28 is placed in the frame 10. An electromagnet (not shown) is placed in a lower portion of the frame 10. The electromagnet is electrically connected to the control unit 28.

The elevating unit 14 includes three levers 30, an axle 32, a gear 34, a rack 36, a slate 38 and two tracks 40. The levers 30 are placed out of the frame 10. The axle 32 includes a first end placed out of the frame 10 and a second end placed in the first chamber 20. The levers 30 are connected to the first end of the axle 32. The gear 34 is supported on the axle 32 in the first chamber 20.

The rack 36 is engaged with the gear 34. The slate 38 is formed with a rib 42 on a rear side and two edges 44 on two lateral sides. The rack 36 is connected to the rear side of the slate 38. The rack 36 is placed against the rib 42 and hence precisely positioned. The edges 44 together form a dovetail.

Each of the tracks 40 is formed with a groove 46. The tracks 40 are connected to a front side of the frame 10, so that the grooves 46 together become a dovetail groove. The dovetail, which consists of the edges 44 of the slate 38, is movably placed in the dovetail groove, which consists of the grooves 46 of the tracks 40. Thus, the slate 38 is smoothly movable along the tracks 40.

The drilling unit 12 is secured to a front side of the slate 38, so that the drilling unit 12 is movable together with the slate 38.

The cable assembly 16 includes a cable 48, a protecting unit 50 and a cap 52. A first end of the cable 48 is electrically connected to the control unit 28. A second end of the cable 48 is electrically connected to the drilling unit 12.

The cap 52 is formed with an aperture 54, an opening 56 and two flanges 58. The aperture 54 is made in a side of the cap 52. The opening 56 is made in a front face of the cap 52. The side of the cap 52 extends perpendicular to the front face of the cap 52. The flanges 58 and the opening 56 extend in a same plane. The cable 48 is inserted through the aperture 54 and the opening 56. The flanges 58 are secured to the drilling unit 12 by screws (not numbered).

The protecting unit 50 is made of a flexible tubular configuration for receiving the cable 48. The protecting unit 50 includes rings 60 and first and second connectors 62 and 64. The rings 60 and the connectors 62 and 64 are connected to one another, so that the protecting unit 50 looks like a hollow caterpillar track. The first connector 62 is secured to the front portion of the frame 10 by a screw (not shown). Two screws (not numbered) are used to secure a bent portion of the second connector 64 to the side of the cap 52 in which the aperture 54. Thus, the cable assembly 16 is concealed in the first chamber 20 except the second connector 64.

Figure 5:
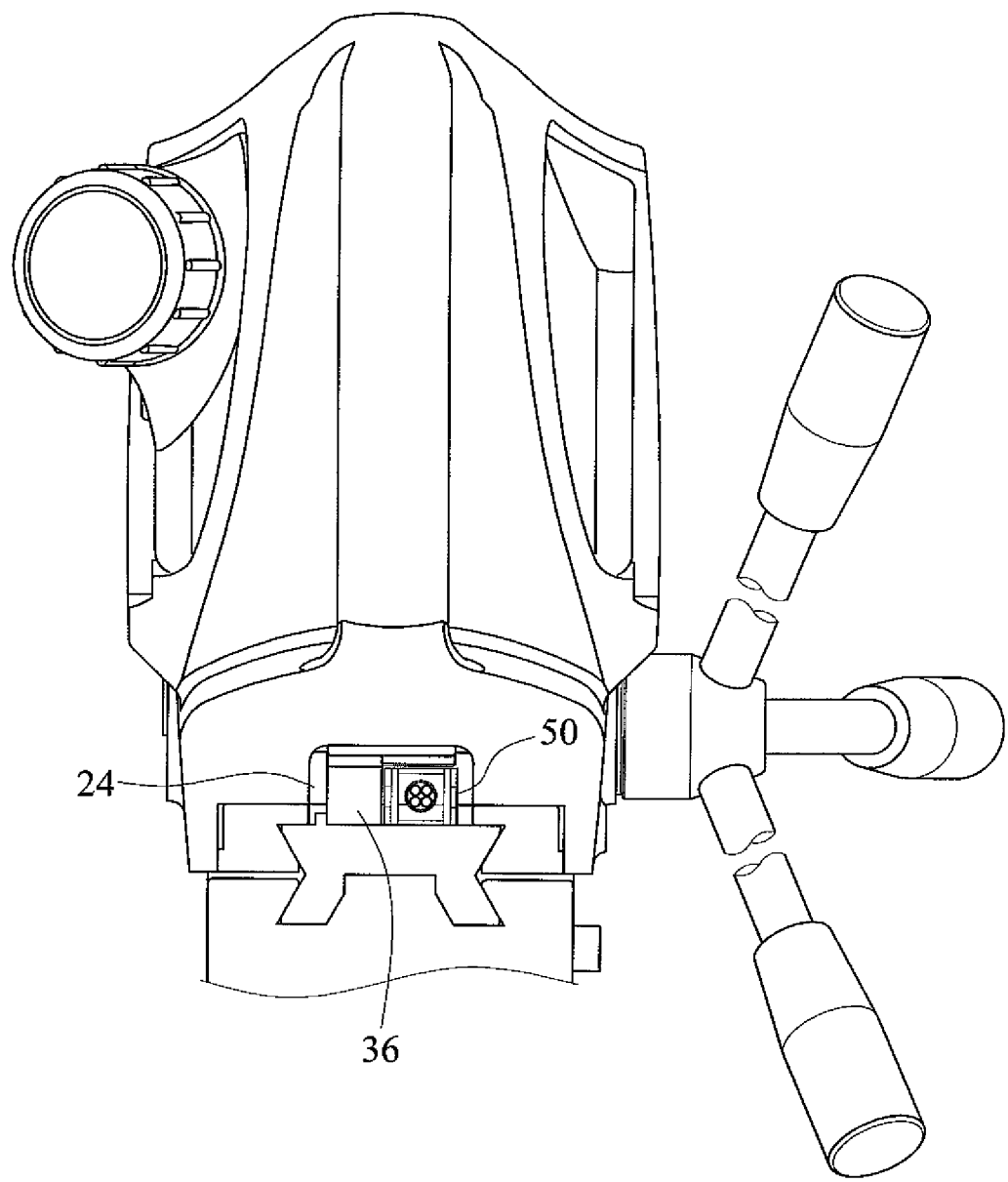
FIG. 5 is an enlarged, partial, top view of the drilling machine illustrated in FIG. 1.

Referring to FIG. 5, the rack 36 and the protecting unit 50 are placed in the cutout 24. The cutout 24 allows movement of the rack 36 and the protecting unit 50.

Referring to FIG. 2, the container 18 includes a tubular lip 66 formed thereon. The tubular lip 66 can be sealed by a cap 68. The container 18 is placed in the second chamber 22. A cover 70 is attached to the frame 10 to keep the container 18 in the second chamber 22. Thus, the container 18 is protected by the frame 10 and the cover 70.

Figure 6:
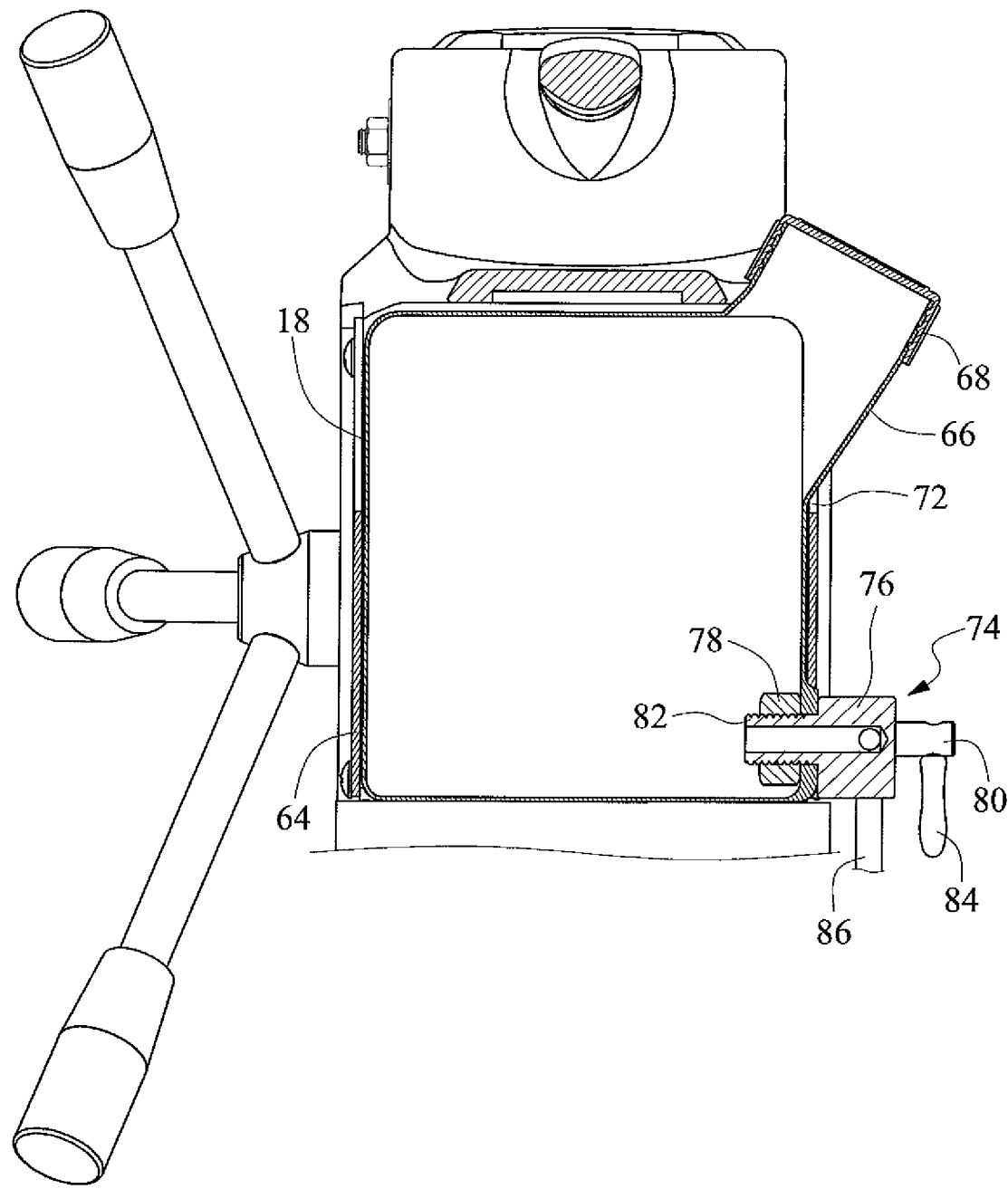
FIG. 6 is a cross-sectional view of the drilling machine shown in FIG. 1.
Figure 7:
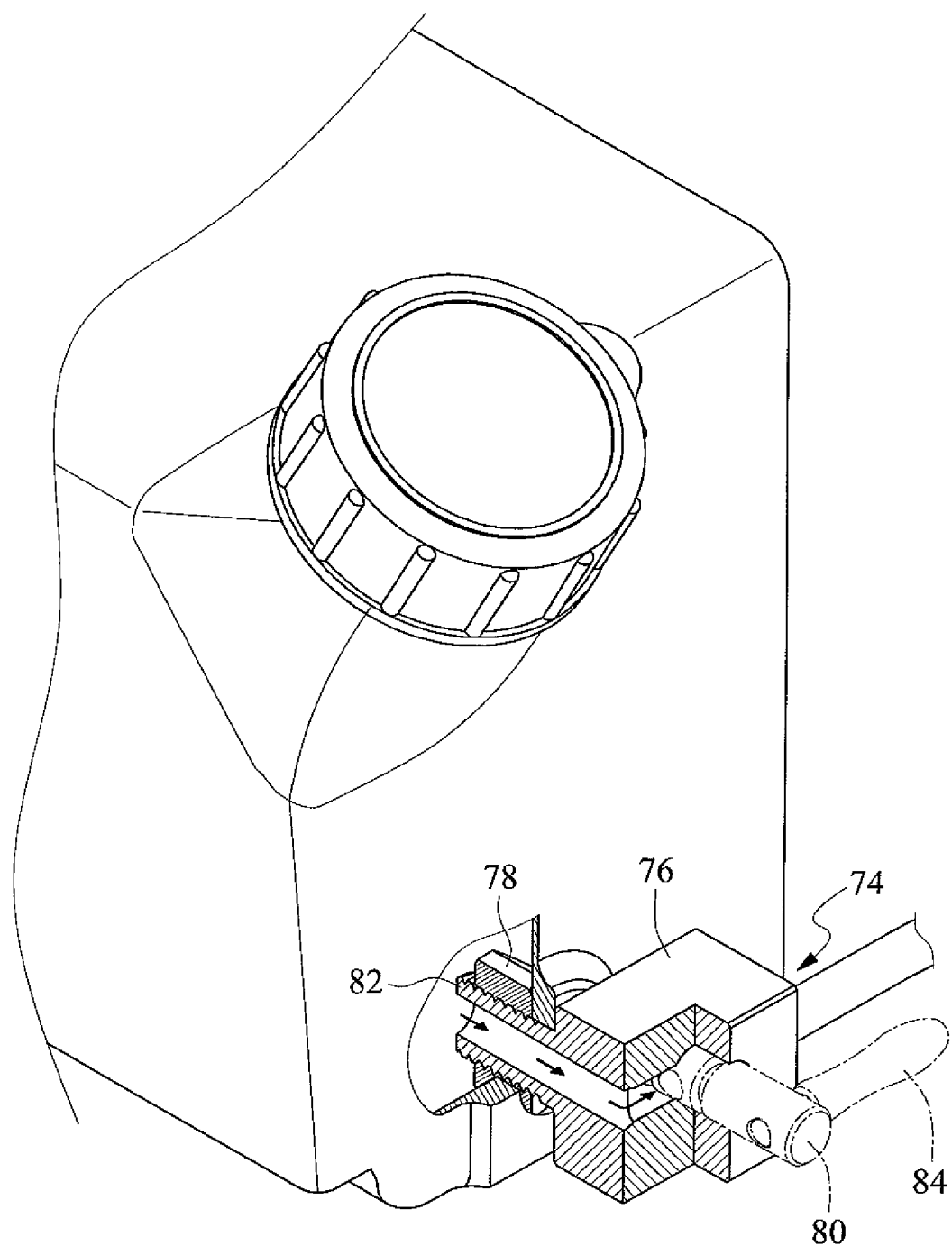
FIG. 7 is an enlarged, partial, cut-away view of the drilling machine shown in FIG. 1.
Figure 8:
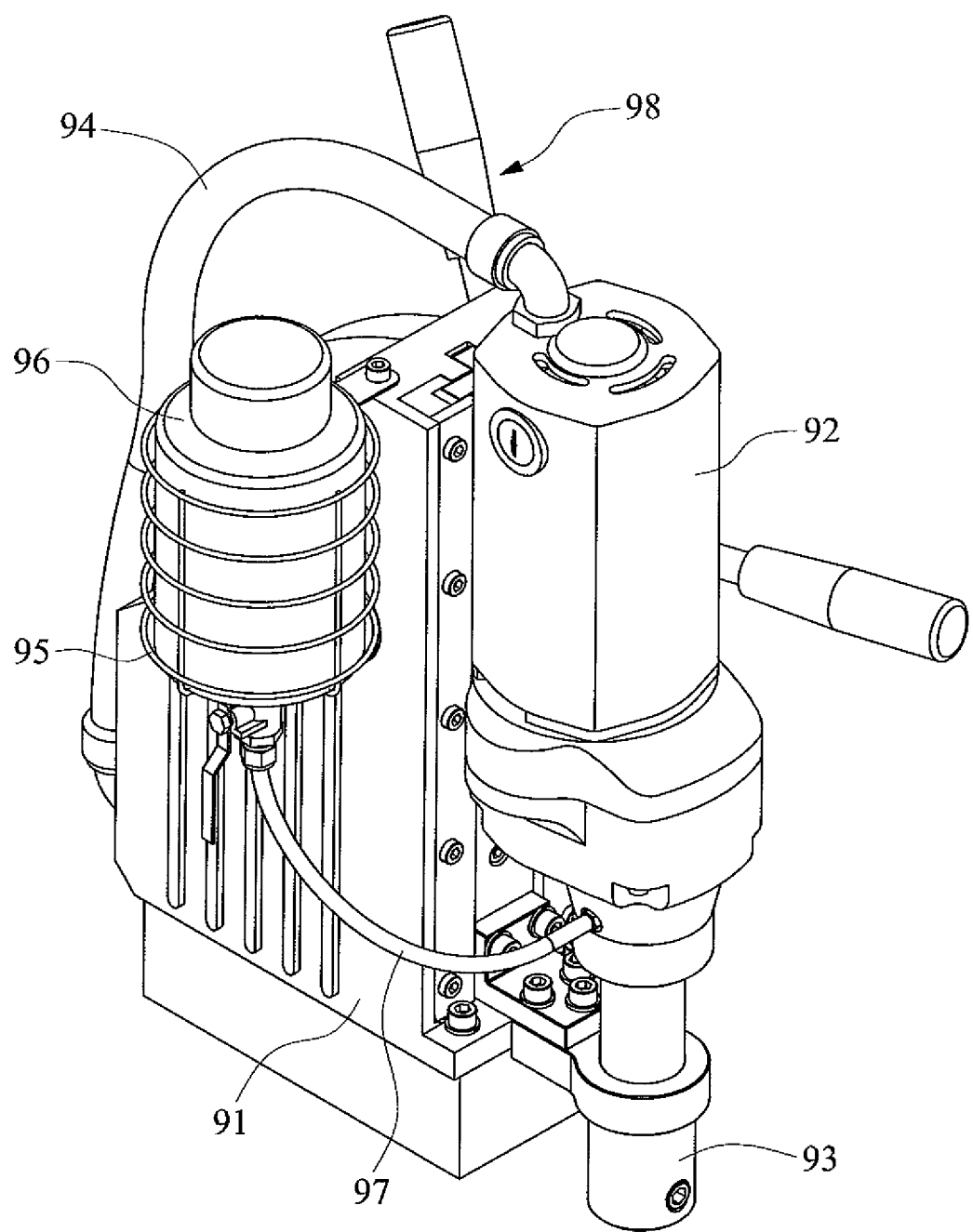
FIG. 8 is a perspective view of a conventional drilling machine.

Referring to FIGS. 6 and 7, the cap 68 is accessible via a window 72 in communication with the second chamber 22. Thus, coolant can be filled into the container 18 after the cap 68 is disengaged from the tubular lip 66.

There is a valve assembly 74 for controlling output of the coolant from the container 18. The valve assembly includes a housing 76, a nut 78 and a valve 80. The housing 76 includes a threaded portion 82 inserted in the container 18 through the frame 10. The threaded portion 82 of the housing 76 is engaged with the nut 78, which is placed in the container 18. The valve 80 includes a portion rotationally inserted in the housing 76 and another portion connected to a handle 84 that is placed out of the housing 76. Thus, the valve 80 is rotatable by maneuvering the handle 84. There is a tube 86 for connecting the housing 76 to a chuck 88 (FIGS. 1 and 2) of the drilling unit 12.

In operation, the electromagnet is turned on to generate magnetism for attachment to a workpiece. Thus, the drilling machine is kept in position on the workpiece when the drilling machine is used to drill the workpiece.

Figure 3:
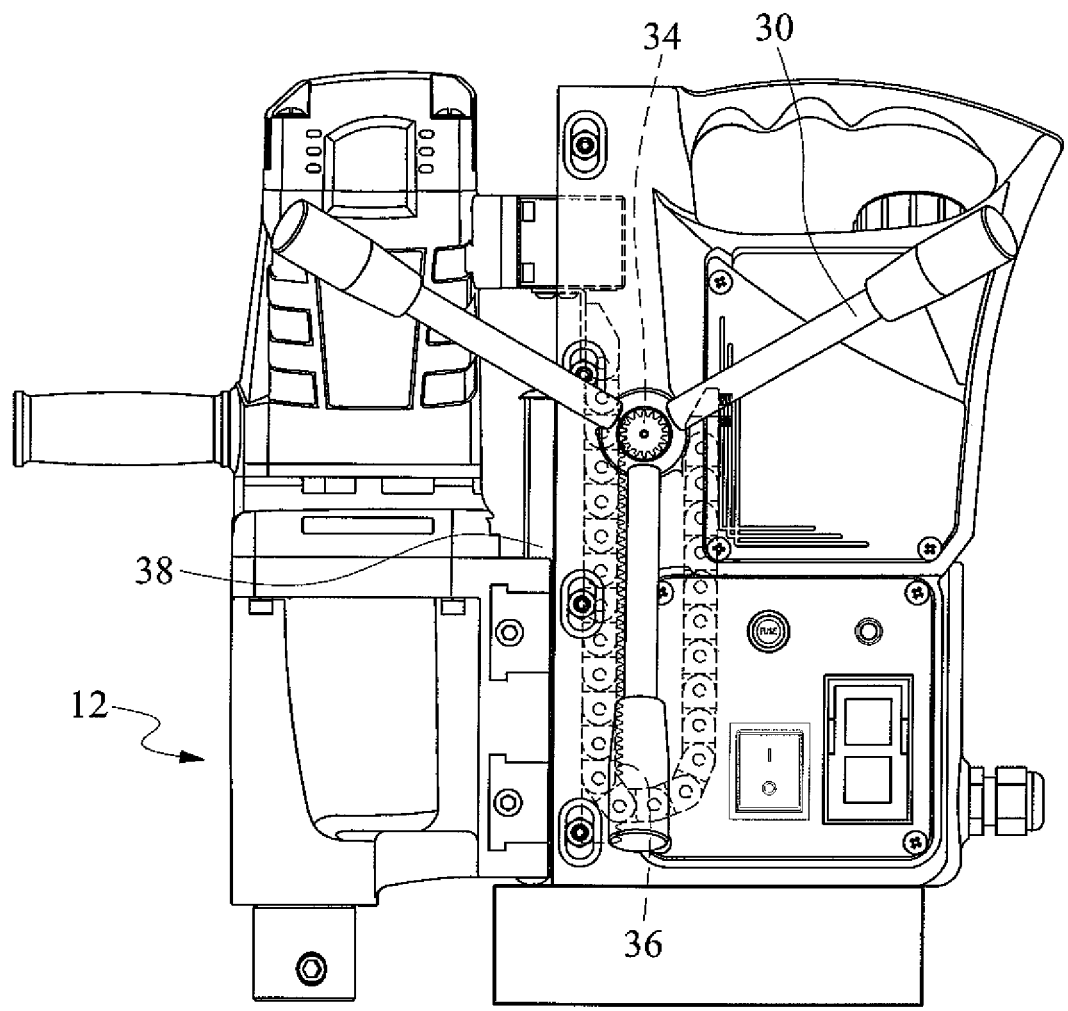
FIG. 3 is a side view of the drilling machine shown in FIG. 1.
Figure 4:
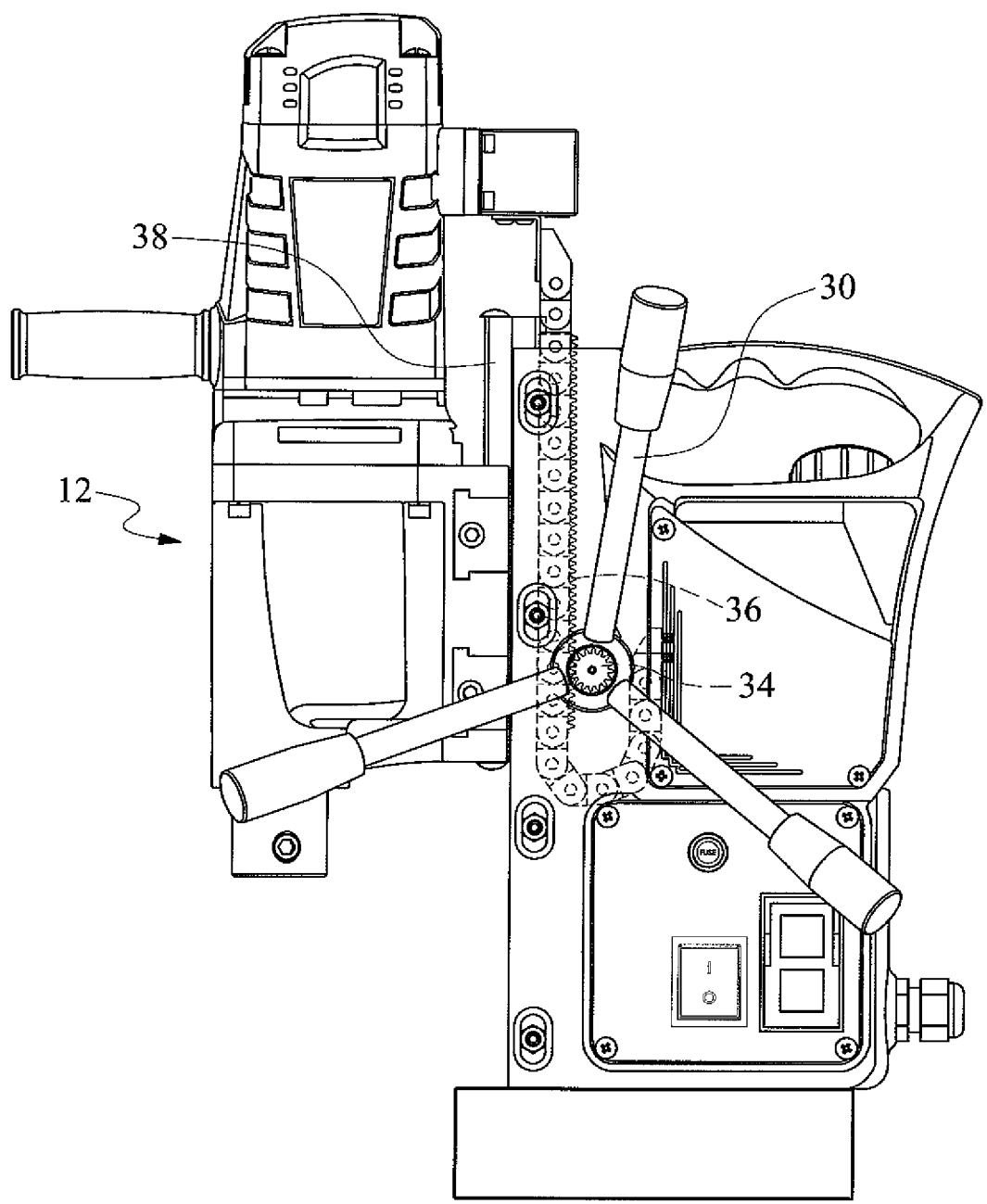
FIG. 4 is a side view of the drilling machine in another position than shown in FIG. 3.

Referring to FIGS. 3 and 4, the user can operate the levers 30 to rotate the gear 34. The rack 36 is moved by the gear 34. The slate 38 is movable together with the rack 36. Thus, the drilling unit 12 is movable up and down together with the slate 38. The movement of the drilling unit 12 on the frame 10 is smooth, because the slate 38 is guided by the tracks 40 (FIG. 2). The drilling unit 12 can be turned on to drill the workpiece. The coolant is transmitted to the chuck 88 from the container 18. Then, the coolant is transmitted to a drill from the chuck 88.

After use, the drilling machine is turned off. Accordingly, the electromagnet is turned off. Thus, the drilling machine can be removed from the workpiece. A user can carry the drilling machine by the handle 26. The user is not tempted to carry the drilling machine by the cable assembly 16 because the cable assembly 16 is concealed by the frame 10 and the drilling unit 12 except the second end of the protecting unit 50.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A drilling machine comprising:
   a frame;
   a control unit connected to the frame;
   a drilling unit movably supported on the frame;
   a cable assembly for connecting the control unit to the drilling unit; and
   a cap connected to the drilling unit, wherein the cable assembly includes a cable for electrically connecting the drilling unit to the control unit, wherein the cable assembly includes a protecting unit for protectively containing the cable, wherein the protecting unit includes a first end connected to the frame and a second end connected to the drilling unit, wherein the protecting unit includes a first connector at the first end, a second connector at the second end, and rings between the first and second connectors, wherein the rings and the first and second connectors are pivotally connected to one another, wherein the first connector is connected to the frame, wherein the second connector is connected to the drilling unit, wherein the second connector is connected to the cap, wherein the cable is inserted through the cap, and wherein the cable assembly is concealed between the frame and the drilling unit.

2. The drilling machine according to claim 1, wherein the cap includes two flanges connected to the drilling unit.

3. The drilling machine according to claim 1, wherein the cap includes an aperture and an opening, and wherein the cable is inserted through the aperture and the opening.

4. The drilling machine according to claim 1, further including two tracks connected to the frame and a slate connected to the drilling unit, wherein the slate is movable along the tracks.

5. The drilling machine according to claim 4, wherein each of the two tracks includes a groove, and wherein the slate includes two edges each movable in the groove of a corresponding one of the two tracks.

6. The drilling machine according to claim 4, including a rack connected to the slate, a gear engaged with the rack and connected to the frame, and levers connected to the gear and operable for rotating the gear.

7. The drilling machine according to claim 6, wherein the slate includes a rib for positioning the rack.

8. The drilling machine according to claim 7, wherein the frame includes:
   a space for containing the cable assembly, the rack and the rib; and
   a cutout through which the cable assembly, the rack and the rib extend from the space.

9. The drilling machine according to claim 1, further including a container contained in the frame.

10. The drilling machine according to claim 9, wherein the frame includes a chamber for containing the container.

11. The drilling machine according to claim 10, wherein the container includes a tubular lip, and wherein the frame includes a window for receiving the tubular lip.

12. The drilling machine according to claim 11, wherein the container is formed with a tubular lip, wherein the frame includes a window in communication with the chamber, and wherein the tubular lip is accessible through the window with coolant filled into the container through the tubular lip.

13. The drilling machine according to claim 12, further including a cap for engagement with the tubular lip.

14. The drilling machine according to claim 11, further including a valve assembly controlling output of the coolant from the container.

15. The drilling machine according to claim 14, wherein the valve assembly includes:
   a housing including a threaded portion inserted in the container through the frame;
   a nut engaged with the threaded portion of the housing;
   a valve including a portion inserted in the housing; and
   a handle connected to another portion of the valve that is placed out of the housing.

* * * * *